(12) United States Patent
Miller (10) Patent No.: US 8,756,696 B1
(45) Date of Patent: Jun. 17, 2014

(54) SYSTEM AND METHOD FOR PROVIDING A VIRTUALIZED SECURE DATA CONTAINMENT SERVICE WITH A NETWORKED ENVIRONMENT

(75) Inventor: Brian Miller, Bel Air, MD (US)

(73) Assignee: SRA International, Inc., Fairfax, VA (US)

( * ) Notice: Subject to any disclaimer, the term of this patent is extended or adjusted under 35 U.S.C. 154(b) by 76 days.

(21) Appl. No.: 13/284,874

(22) Filed: Oct. 29, 2011

Related U.S. Application Data (60) Provisional application No. 61/408,586, filed on Oct. 30, 2010.

(51) Int. Cl.
*H04L 29/06* (2006.01)
*G06F 21/53* (2013.01)
*G06F 11/30* (2006.01)

(52) U.S. Cl.
CPC .............. *H04L 63/14* (2013.01); *H04L 63/04* (2013.01); *G06F 21/53* (2013.01); *G06F 11/301* (2013.01); *H04L 63/1416* (2013.01)
USPC .............................. 726/25; 726/24; 709/247

(58) Field of Classification Search
CPC ..... H04L 63/14; H04L 63/1416; G06F 21/53; G06F 11/301
USPC ....................................... 726/24, 25; 709/247
See application file for complete search history.

(56) References Cited

U.S. PATENT DOCUMENTS

| | | | |
|---|---|---|---|
| 4,760,526 A * | 7/1988 | Takeda et al. ..................... 1/1 |
| 5,063,499 A * | 11/1991 | Garber ............................ 703/27 |
| 5,497,492 A * | 3/1996 | Zbikowski et al. ................ 713/2 |
| 5,961,586 A | 10/1999 | Pedersen |
| 6,065,118 A | 5/2000 | Bull et al. |
| 6,157,944 A | 12/2000 | Pedersen |
| 6,981,279 B1 | 12/2005 | Arnold et al. |
| 7,356,736 B2 | 4/2008 | Natvig |
| 7,457,886 B1 * | 11/2008 | Smith ............................... 710/6 |
| 7,577,722 B1 | 8/2009 | Khandekar et al. |
| 7,644,312 B2 | 1/2010 | Hind et al. |
| 7,657,834 B2 | 2/2010 | Hanson |
| 7,669,186 B2 | 2/2010 | Nolan et al. |

(Continued)

FOREIGN PATENT DOCUMENTS

| WO | WO/02/35328 | 5/2002 |
|---|---|---|
| WO | WO/2008/048665 | 4/2008 |

OTHER PUBLICATIONS

Chen, "On state of the art in virtual machine security", 2012, IEEE, p. 1-6.*

*Primary Examiner* — Taghi Arani
*Assistant Examiner* — Gregory Lane
(74) *Attorney, Agent, or Firm* — Robert Platt Belle (57) ABSTRACT

The present invention relates to a technique for debugging and testing potential virus, trojans, and other malware programs. The present invention, named Cyberlock™ provides a technique to analyze malware programs on a network in a secure manner, which allows multiple users to access or monitor the analysis. In the present invention, a virtual machine (VM) may be run on a network, emulating the operation of a Windows, LINUX, or Apple operating system (or other O/S), and the malware or suspected malware may be executed on that virtual machine. The virtual machine is isolated on the network, but accessible to one or more users, in such a manner than the malware or suspected malware may be analyzed.

30 Claims, 5 Drawing Sheets

(56) References Cited

U.S. PATENT DOCUMENTS

| | | |
|---|---|---|
| 8,037,178 B1 * 10/2011 | Agarwalla et al. | 709/225 |
| 2002/0087950 A1 7/2002 | Brodeur et al. | |
| 2006/0069662 A1 3/2006 | Laborczfalvi et al. | |
| 2006/0075381 A1 4/2006 | Laborczfalvi et al. | |
| 2006/0190988 A1 8/2006 | Adams et al. | |
| 2006/0206457 A1 * 9/2006 | Crucs | 707/3 |
| 2007/0174429 A1 7/2007 | Mazzaferri et al. | |
| 2007/0174915 A1 * 7/2007 | Gribble et al. | 726/24 |
| 2007/0180450 A1 8/2007 | Croft et al. | |
| 2007/0186212 A1 8/2007 | Mazzaferri et al. | |
| 2007/0192329 A1 8/2007 | Croft et al. | |
| 2007/0198656 A1 8/2007 | Mazzaferri et al. | |
| 2008/0040710 A1 2/2008 | Chiriac | |
| 2008/0127114 A1 5/2008 | Vasudevan | |
| 2008/0141376 A1 6/2008 | Clausen et al. | |
| 2008/0244525 A1 10/2008 | Khalil et al. | |
| 2008/0244575 A1 * 10/2008 | Carter et al. | 718/1 |
| 2008/0271015 A1 * 10/2008 | Ibrahim | 718/1 |
| 2008/0320594 A1 12/2008 | Jiang | |
| 2009/0216975 A1 8/2009 | Halperin et al. | |
| 2009/0241192 A1 9/2009 | Thomas | |
| 2009/0276774 A1 * 11/2009 | Kinoshita | 718/1 |
| 2009/0282101 A1 11/2009 | Lim et al. | |
| 2009/0282483 A1 11/2009 | Bennett | |
| 2010/0031353 A1 2/2010 | Thomas et al. | |
| 2010/0057865 A1 3/2010 | Chan et al. | |
| 2010/0100930 A1 * 4/2010 | King | 726/1 |
| 2010/0106826 A1 * 4/2010 | Sugawara | 709/224 |
| 2010/0122248 A1 5/2010 | Robinson et al. | 718/1 |
| 2010/0138830 A1 * 6/2010 | Astete et al. | 718/1 |
| 2010/0161922 A1 * 6/2010 | Sharp et al. | 711/162 |
| 2010/0242038 A1 * 9/2010 | Berrange et al. | 718/1 |
| 2010/0306380 A1 * 12/2010 | DeHaan | 709/226 |
| 2010/0306413 A1 * 12/2010 | Kamay | 709/247 |
| 2010/0306771 A1 * 12/2010 | Kamay et al. | 718/1 |
| 2010/0313255 A1 * 12/2010 | Khuda | 726/7 |
| 2011/0066841 A1 * 3/2011 | Goodrow et al. | 713/150 |
| 2011/0154023 A1 * 6/2011 | Smith et al. | 713/155 |
| 2011/0154101 A1 * 6/2011 | Merwe et al. | 714/5.1 |
| 2012/0066487 A1 * 3/2012 | Brown et al. | 713/150 |

* cited by examiner

SYSTEM AND METHOD FOR PROVIDING A VIRTUALIZED SECURE DATA CONTAINMENT SERVICE WITH A NETWORKED ENVIRONMENT

STATEMENT OF GOVERNMENT INTEREST

At least portions of the present invention were developed under contract with the United States Government. The United States Government may have certain rights in this invention.

CROSS-REFERENCE TO RELATED APPLICATIONS

The present application claims priority from Provisional U.S. Patent Application No. 61/408,586 filed on Oct. 30, 2010, and incorporated herein by reference.

FIELD OF THE INVENTION

The present invention relates to a system and method for providing a secure data containment service in a networked environment that integrates a Virtual Machine, secure desktop viewer, proxy server, and server side security profile.

BACKGROUND OF THE INVENTION

Malware is increasingly a problem for computer users on the Internet. An unskilled or unsuspecting computer user may inadvertently visit a website which may install a malware trojan into their computer, or download an e-mail attachment which may a computer virus. Malware has expanded as applications for computers have expanded. Malware is being transmitted through cellular networks to smart phones and other devices, such as PDAs and the like. It has even been found on peripherals and accessories, or embedded into commercial software.

Originally, most malware was created by hackers, who were interested only in testing the limits of their skills. Some malicious codes could alter data on hard drives or even erase (reformat) hard drives or re-write the boot sector. These types of computer viruses were annoying and troublesome, but other than lost data and downtime, not of great economic impact. In more recent times, such malware has been created with more immediate economic motives—to capture passwords, bank account information, PIN numbers and other personal information for use in identity theft and credit card fraud. Other types of malware, such as trojans, install themselves in a computer and pose as anti-virus programs, demanding that the user pay a fee (usually to an off-shore provider) to "remove" the virus.

Other types of malware, install "bot" programs into user computers, so that such computers can be used as part of "bot networks" to be used to transmit SPAM messages and the like, and for other illegal purposes. These types of "bot" programs may not damage the user's computer data, but may slow the computer and slow access to the Internet. Similarly, spyware and the like may be used to monitor a user's access to the Internet to monitor websites visited and then report back this data to commercial users for use in marketing. Such programs may be viewed as an invasion of privacy and also may slow computer speed and access.

Most of these types of malware programs have been fairly easy to detect, and counter-measures, in the form of anti-virus programs and malware and spyware detection programs. Many of these programs are available free to users on the Internet, at least as trial or freeware versions. Malware represents a tremendous loss in time and money to businesses and individual users, in terms of data loss, data theft, and also in the time and money spent in removing malware and also screening for it and recovering from data loss.

Until recently, the threat of malware has been mostly in the form of disruption (hacking pranks) or economic in nature (e.g., stealing banking or credit card data or passwords). However, it is possible that malware may be used for other purposes now, or in the future. Foreign governments routinely probe and attempt to hack into U.S. Government computer systems, as well as those of major businesses, industries, and educational institutions. In many instances, these attempts at access are mere probes of system weaknesses, perhaps for future exploits. In other cases, actual data is stolen. A concern exists that malware could be used as a means of economic disruption or as a political tool or even as a weapon, in order to crash networks or individual computers or to gain unauthorized access to such computers or networks.

Thus, rapid detection and evaluation of malware is an increasingly pressing need. Prior Art techniques of waiting for malware attacks to occur and then attempting to isolate and detect new malware are increasingly inefficient. Detection and immunization from such malware attacks, in the Prior Art, usually only occurred after a user's computer had already been attacked and data lost. Some more aggressive malware protection companies actively search for new malware on the Internet and attempt to develop prophylactic cures for such viruses, trojans, worms, and the like. But such active approaches require many man-hours of labor to search for such programs and then operate such programs to detect whether a virus, worm, or trojan is present.

In the Prior Art, if a user wished to test or analyze a malware program, it may have been necessary to run such a program on a stand-alone computer, so as to prevent such a malware program from infecting other computers on the network. One problem with such an approach is that if the malware causes the computer to crash, it may not be possible to analyze in real-time, how the malware functioned and performed and what actions it takes. In addition, such a technique does not allow multiple users to monitor and analyze the malware program. In the event malware is detected, it may be necessary to completely reformat and wipe the hard drive of such a machine and re-install the operating system to erase damage caused by the malware. And since the malware may be programmed to cover its tracks, detecting how the malware works and its various signatures may be difficult using a physical computer system.

Thus, a need exists in the art for a system which allows a user to operate suspected malware in a manner that is safe and observable, and also allows this data to be rapidly shared with others. In addition, a need exists in the art for a technique that allows a user to rapidly analyze suspected malware, without having to physically reformat hard drives and re-install operating systems after each use. In addition, a need exists in the art for a system which allows a user to analyze operation of suspected malware such that operation of the malware and detection of its characteristic signatures is possible, even if the malware attempts to disguise itself or erase evidence of its presence.

Virtual Machines are known in the art for emulating the operating systems of a number of computers. A Virtual Machine (VM) comprises software running on a computer system that emulates the operation of, for example, a particular operating system. Using a Virtual Machine, a user can run applications intended for a number of different operating systems, such as Windows, Mac O/S, Linux, and the like, without using the physical hardware ordinarily associated with such operating systems. Thus, for example, a user could operate a Linux program on a Windows-based system by creating a Linux VM operating within the Windows O/S. Such Virtual Machines are useful in operating non-native programs on a particular hardware infrastructure and for other purposes.

Bull et al., U.S. Pat. No. 6,065,118, issued May 16, 2000, assigned to Citrix Systems, Inc. and incorporated herein by reference, discloses a mobile code isolation cage. This system is described as reducing the risk of damage to data or programs in an end user computer system programmed to operate in response to an imported data stream containing one or more mobile program components from an external source. The incoming data stream is screened to identify mobile program components of that data stream. Some of the mobile program components are passed to a program execution location isolated from the end user system prior to being executed to operate in a desired manner. The execution location has an interface with the external source of the data stream and an interface with the end user system. The operation of the interface between the execution location and the end user system is programmed so that only data which has been interacted on by the program component within the execution location in a specified and controlled manner can be passed to and from the end user system. The system of the Bull Patent appears to be capable of isolating mobile code, but does not appear to be applicable to use with detecting and analyzing potential malware.

Mazzaferri et al., Published U.S. Patent Application Ser. No. 2007/07198656, published Aug. 23, 2007, assigned to Citrix Systems, Inc. and incorporated herein by reference, discloses methods and servers for establishing a connection between a client system and a virtual machine executing in a terminal services session and hosing a requested computing environment. Mazzaferri discloses that his system receives a request from a client system for an enumeration of available computing environments. Collected data regarding available computing environments are accessed, and accessed data are transmitted to a client system, the accessed data indicating to the client system each computing environment available to a user of the client system. A request is received from the client system to access one of the computing environments. A connection is established between the client system and a virtual machine hosting the requested computing environment via a terminal services session, the virtual machine executed by a hypervisor executing in the terminal services session provided by an operating system executing on one of a plurality of execution machines. The Mazzaferri application appears to disclose the use of selecting and operating a virtual machine over a computer network.

Croft, et al., Published U.S. Patent Application Ser. No. 2007/0192329, published Aug. 16, 2007, assigned to Citrix Systems, Inc. and incorporated herein by reference, discloses a method for executing, by a virtual machine, an application program requested by a client machine. The method includes the step of receiving a file including access information for accessing a plurality of application files and for executing a first client capable of receiving an application stream. An identification of the plurality of application files is retrieved, responsive to the received file. At least one characteristic required for execution of the plurality of application files is retrieved, responsive to the file. A determination is made as to whether a client machine includes the at least one characteristic. A second client is executed, responsive to a determination that the client machine lacks the at least one characteristic, the second client requesting execution of the plurality of application files on a remote machine comprising a virtual machine providing a computing environment having the at least one characteristic. Croft et al. appears to teach the concept of executing a Virtual Machine over a network.

Arnold et al., U.S. Pat. No. 6,981,279, issued Dec. 27, 2005, assigned to International Business Machines Corporation and incorporated herein by reference, discloses a system and a method for dynamically analyzing software, some of whose potentially-important behaviors (such as worm-like behavior) may only be displayed when the software is executed in an environment where it has, or appears to have, access to a production network and/or to the global Internet. The software may be executed in a real or an emulated network environment that includes a monitoring component and an emulation component. The monitoring component serves to capture and/or record the behaviors displayed by the software and/or other components of the system, and the emulation component gives the software being analyzed the impression that it is executing with access to a production network and/or to the global Internet. The software being analyzed is effectively confined to the analysis network environment, and cannot in fact read information from, or alter any information on, any production network or the global Internet. Arnold et al. appears to teach the idea of emulating a communications network to determine how a worm-type program propagates over such a network.

In examining a standard Virtual Machine (VM) configuration, a series of undocumented and unpublished settings create serious security threats that may potentially allow harmful data, root kits, and other malicious code to access a network. Thus, using a Virtual Machine (VM) on a network to examine potential malware could create a security concern for the network, as the malware could exploit these security threats and infect or access computers connected to the virtual machine through the network. Thus, it remains a requirement in the art to provide a means of addressing these embedded security flaws and provide a series of solutions to ensure that potentially harmful data is unable to leak from a virtual machine environment onto a network.

SUMMARY OF THE INVENTION

The present invention relates to a technique for debugging and testing potential virus, trojans, and other malware programs. The present invention, named Cyberlock™ provides a technique to analyze malware programs on a network in a secure manner, which allows multiple users to securely access or monitor the analysis.

The present invention provides a system and method for providing a secure data containment service in a networked environment that integrates a Virtual Machine, secure desktop viewer, proxy server, and server side security profile.

The invention is an integrated solution that encompasses a series of unique server side virtual machine configurations, custom middleware script, and a secure desktop viewer that assures that any data, applications, or code contained within the aforementioned environment is unable to interfere with a network.

The primary application of this secure data containment solution is for malware analysis and reverse engineering activities that could potentially negatively impact a network, but other applications are anticipated where sensitive, private, or classified information needs to be viewed in a secure environment requiring the same data containment protections. These data or records viewing applications might include Electronic Healthcare records, Law Enforcement or Investigations information, Intellectual Property, and Financial or Personally Identifiable Information, source code and Payment Card Information (PCI). The present invention may be applied to PC applications, as well as mobile devices, tablets, personal digital assistants, and other devices. The present invention may be embodied as appliance as well as a software/hardware system.

In the present invention, a Virtual Machine (VM) may be run on a network, running commercial operating systems, including Windows, LINUX, or Mac (or other O/S), and the malware or suspected malware may be executed on that Virtual Machine. The Virtual Machine is isolated on the network, but accessible to one or more users, in such a manner than the malware or suspected malware may be analyzed.

Running the suspected malware on the Virtual Machine allows the operation of the suspected malware to be analyzed, with no risk to the underlying computer system or network. In addition, since the Virtual Machine is operating on a network, multiple users may access the system to study and analyze the suspected malware, in order to develop effective detection strategies and countermeasures.

One problem encountered in the development of the present invention was to provide a contained data solution to enable the analyst to look at applications and data in an environment that won't interfere with the network. As noted previously, in examining a standard Virtual Machine configuration, a series of undocumented and unpublished settings create serious security threats that would potentially allow harmful data, root kits, and other malicious code to access a host and/or a network. The present invention addresses these embedded security vulnerabilities and provides a series of solutions to ensure that potentially harmful data, applications, or processes are unable to leak from a Virtual Machine environment onto a network.

A server-side solution is provided to cut off communication from the VM from the network. Channels are used to prevent malware from hitting the network. The present inventor researched 21 different containment solutions and has provided a capabilities list for the end user to prevent malware from crossing over from the Virtual Machine to the network.

DETAILED DESCRIPTION OF THE INVENTION

In one embodiment of the present invention, the virtual machine is enabled using VMware are provide by VMware, Inc. of Palo Alto, Calif. The use of VMware is by way of example only, and to illustrate the preferred embodiment of the present invention contemplated at the time of filing. While disclosed on the context of VMware, for the purposes of illustration, other types of Virtual Machine software may be used within the spirit and scope of the present invention.

In the present invention, VMware or other Virtual Machine software may operate as a hyperviser or Virtual Machine Manager. Within the VM Ware server; undocumented configuration components were discovered by testing the functionality of the vmware program. By altering these undocumented configuration components, the vmware can be locked down, preventing the software from communicating out of the public variables within the software code. To implement this feature, an application is employed to call for available variables.

Server side configurations, both Memory and Bridge were investigated to insure that a virus or other malware could not breach the server. In each instance, a specific VM variable was identified and equated to corresponding memory addresses. Three known viruses were used to hop memory and didn't get through.

Flexible memory features (changing memory size) was locked down, in part to prevent memory hopping viruses from getting through. The partition space of RAM and shared memory are never locked down—the Operating System (OS) may not provide any other applications from accessing memory, thus preventing memory leakage. Locking down flexible memory features prevents executables from being stored in memory and therefore accessing the OS, network, and other applications, keeping memory from being a potential threat vector.

To allow network users to view a display output from the virtual machine running the suspected malware, a remote display within VMware is enabled by defining three VMware variables. The remote display uses the Virtual Network Computing (VNC) protocol versus the standard VMware display protocol to get a display back to the network user. The remote display is displayed back via an applet, which is part of the present invention, using the Remote Framebuffer (RFB) protocol to additionally reduce network traffic—but doesn't include sound. The display back is sent back to the network user via an SSL tunnel. The applet was written to overcome shortfalls in the default VNC configuration that negatively impacted the aspect ratio and colors of the display.

The applet, which enables remote display of the virtual machine desktop, is provided automatically by the application and stored by the browser into its cache on the desktop of each user in the system. The applet is needed to provide the seamless display of the desktop back to the end user. While this approach loses the emulation of the actual desktop, remote viewing provides less impact on the customer installation requirements and enhances security. The applet circumvents the default requirement to use VMware's proprietary interface, which requires endpoint installation, configuration of groups, usernames and passwords for all users of the system.

Port assignments are also reassigned to a predetermined range of ports, such that each VM gets its own port number, thus allowing administrators to assign one user to one VM versus all users coming into the display via one port. Unassigned ports are locked to prevent use by malware as a pathway.

A custom written VNC applet Secure Socket Layer (SSL) is enabled and it communicates to the proxy server as a man in the middle. The SSL tunnel goes from users desktop to proxy that sits on the same server as VMware. A two-way SSL encrypted tunnel prevents hijacking of the session, stealing passwords, etc, and may be 256-bit encrypted. This approach prevents a malware application from sitting on the server and viewing the session. With regard to passwords, each VM requires a password to get into the VNC port.

VMware allows the VNC server to be enabled or disabled via a configuration setting present in the virtual machine's .vmx configuration file. For the purposes of the present invention, the standard VM proprietary display is turned off and the MUI file is not installed, and the (VMware console port) is blocked in the local Linux firewall. The VNC server is enabled (set to "true") in the configuration file. The application is specifically designed to understand how VNC, VMware and SSL integrate, calling specific commands in VMware to allocate a VM session to a specific user and port.

VMware, by default, turns on bridge network which bridges the virtual machine's network card to the hardware's network card, even if VMware is directed to run a natted network or host only. The bridge is always hidden and always there, even if disabled. The VMware uses the host IP address; always leaves on the bridged network to have access, which creates a possible exploit for malware. VMware hides the bridge network from most users. To get around this possible security breach, in the present invention, the bridge network under Linux file system is removed, and VMware is instructed to not use the bridge (cobbler puppet load).

Other Virtual Machine configurations may be modified to improve performance. For the Linux Server, the default regular scheduler of the Linux OS is changed to use the deadline scheduler for all requests. This technique improves the responsiveness of the VMs under heavy loads, where I/O responsiveness is a key area. In the boot menu, editing 'elevator'=deadline; changes the default scheduler of the entire OS. A total of four schedulers are built in.

Another technique to prevent data breaches is to modify how the OS handles memory. In this embodiment, the sys control config file is lowered to 'zero' (e.g., "vm.swappiness=zero") which tells OS to not swap processes out of RAM to hard disk. Similarly, setting the variable vm.overcommit_memory=1 disallows the OS from overcommitting memory that it currently has installed. This acts as a backup to the process swap to keep the OS from swapping from RAM to disk and therefore potentially writing viruses to disk (e.g., Linux kernal specific parameters). This fix guarantees that an executable isn't getting written to the host hard disk.

The SE Linux security policy is a next layer in the system and is a fine-grained security policy. If there is some kind of memory buffer overflow, the system of the present invention may detect that overflow and document the elements/settings to understand why it occurred. This detection is based on DCID 6/3 as well as proprietary coding.

The Linux firewall in another area of vulnerability that the present invention secures. The present invention turns off the 902/903 VMconsole port and print outs specific Linux firewall settings. Certain settings, 6901+, 443, 80, etc. may be allowed, while others may be disabled. A proxy handles the SSL connection and request to Perl scripts that call VMware. VNware's Application Programming Interface (API) uses perl between the proxy and the VMware. In some instances VMware comes back with a dialogue box. The perl script handles all the communications with VMware on behalf of the user.

A unique/custom ISO file system is created that acts as data bridge between the virtual machine and any number of various OS. This ISO allows VMware to interact with Windows XP, Vista, 2000, NT, Windows 7, Linux, Solaris, and Mac OS. The ISO addresses Unicode characters coming across the data bride that are not normally handled by the ISO command MK ISO FS. The custom ISO can take any file and turn it into a CD image, which can be read by most operating systems.

The server provides web pages that are managed by Tomcat and are written in Java code. The web pages are created on the server and access is governed by a firewall. The web pages and service code functions as an access and control gateway between the user and the VM management software. User authentication and user request handling are performed by the Java code. Web services are also provided by the service and are accessed using the standard SOAP protocol. Customer data is routed by the Java code, preventing access to any system resources by malware contained in the customer data.

The system of the present invention, in the preferred embodiment is enabled on an Intel based machine architecture, although other types of architecture may be used within the spirit and scope of the present invention. The system uses an AMD or Intel microprocessor along with 4 Gigabytes or memory or more. A 250 Gigabyte hard drive is used, providing 12 Gigabytes per Virtual Machine. Two Ethernet ports are provided for networking. Examples of hardware used to implement the system of the present invention include a Dell 2950 2U computer with a two CPU dual core, 16 Gigabytes of memory, a one Terabyte hard drive, and two Ethernet ports. Alternately a Sun Fire X4200 2U system may be employed, using a two CPU dual core, 32 Gigabytes of memory, a 500 Gigabyte hard drive, and four Ethernet ports. The system of the present invention may be implemented on a single computer, or on multiple computers sharing the task.

The architecture of the system may this be distributed an enterprise-wide and also readily expandable. The system may be based on Service Oriented Architecture (SOA). In this manner, the system leverages existing corporate network resources for failover purposes. The system may be published as a resource through corporate Universal Description Discovery, and Integration (UDDI) using OASIS SOA reference model. The OASIS SOA Reference Model is a product of the OASIS SOA Reference Model (SOA-RM) Technical Committee (TC). See, e.g., *OASIS Reference Architecture Foundation for Service Oriented Architecture* 1.0, Committee Draft 2, Oct. 14, 2009, incorporated herein by reference. The multiple mode configuration architecture can be configured for user needs and is expandable from one to many users.

The system is as easy to use as a home PC. It requires little training, as it is not another "tool" to be learned. It also has the flexibility to do what users need. The system provides a choice of which operating environment will best suit the mission need (Full OS/Full Native) Windows OS (all types), Linux (all types), and Solaris 9, 10, among others. Multiple data items may be moved into the environment to perform analysis. Users may modify and save data as well as retrieve data from the system with little user training required. The system allows for custom configuration of Virtual Machine behavior and allows users to run entrusted software in a safe, contained environment.

The user has a choice of operation systems, which are expandable to applications, to reduce expensive application licensing fees. Data, including suspected malware, may be inserted from a media device, such as a CD-ROM, Flash drive, or the like. The system may install applications inside the environment are inter-session persistent. Thus, for example, if a suspected malware program utilizes an exploit in PowerPoint or other applications software, such applications software may be installed and persistent from session to session. It is also possible for a user to install persistent applications in the environment that usually would require installation by a system administrator. The user may manipulate Office Automation tools such as Adobe Acrobat, Zip files, Mail, or any Windows, Linux, or Solaris applications. The user may run their own scripts and develop their own software packages, as well as create their own hierarchy structure for organizing data.

The system of the present invention allows users to test and examine potential malware over a network, while protecting the network as well as the user's endpoint computer. The security is built-in to the system, not added on as a separate program, and thus cannot be defeated by the suspected malware. Data from the Virtual Machine may be displayed back to a user using Secure Socket Layer protocol. Data stays on the backend system Virtual Machine server and is not actually transferred to the user's desktop, thus preventing propagation of any viruses, trojans, or other malware. Isolation between the user's desktop is enforced by the underlying Virtual Machine software, such as VMware of San Francisco, Calif. along with the use of SELinux (Security Enhanced Linux, part of the Fedora project).

Thus, the system features a low development and deployment cost. Power and cooling are minimized, management is simplified, and training costs are low. Only a web browser and Java 1.4 are required on the client side. A single solution is available for multiple analyze roles and little training is required, regardless of role. Solaris and Linux are available at little or no cost, although operating a Windows Virtual Machine does require licensing costs. The system may be managed remotely in a multi-node environment, and is expandable from one to many users at a reduced cost at low resource required areas. Agility scripts may be re-used from session to session.

The system of the present invention may be expanded to include thin application integration and an enhanced management interface. A global Cyberlock web (e.g., Cyberlock.com website) may be employed to allow global implementation of the system over the internet. Alternately, the system may be employed in a single CD (on click) deployment. User data management may be enhance by providing graphical user interface (GUI) user data management for filling and binning. A user saved data director may be used for distributed storage, archiving, scaling, and the like. Enhanced shared data capabilities may be provided along with user data services (translations, service side applications, and the like). Additional applications for the present invention include cross-domain sharing, evaluation of untrusted applications, native viewing of data, development of software applications, analyses of software behavior, among others.

Figure 1:
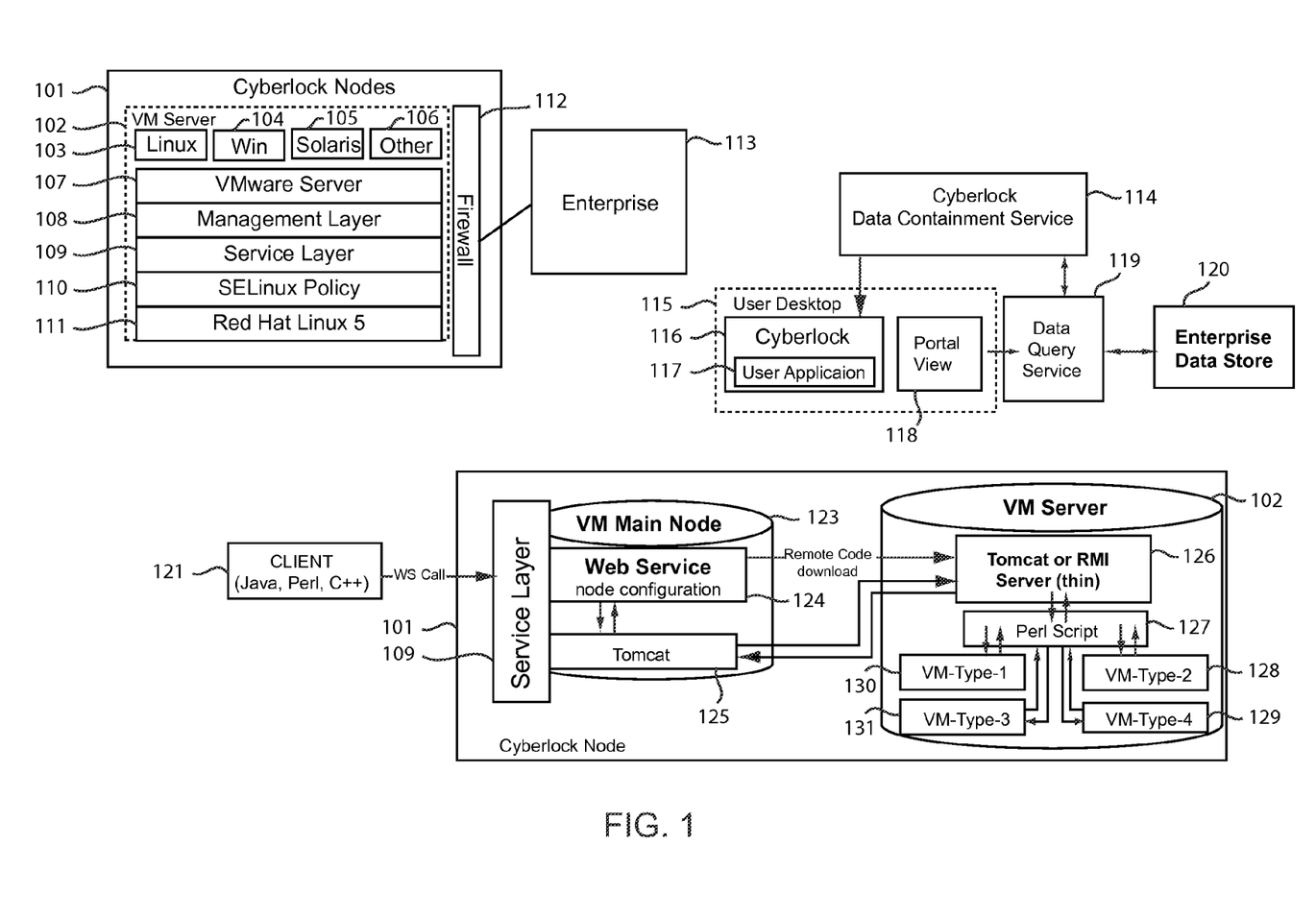
FIG. 1 is a block diagram illustrating a portion of the software architecture of the preferred embodiment of the present invention.

FIG. 1 is a block diagram illustrating a portion of the software architecture of the preferred embodiment of the present invention. Referring to FIG. 1, Cyberlock nodes 101 may include a Virtual Machine server 102 which may run a number of different operating systems, including Linux 103, Windows 104, Solaris 105, and other operating systems 106. Virtual Machine server 102 may also include a VMware server 107, management layer 108, service layer 109, SELinux Policy 110 and Red Hat Linux 5 111, operating in a service layer architecture. Firewall 112 may protect the local enterprise computing network 113 from any malware operating on Cyberlock nodes 101.

The Cyberlock Containment Service 114 operates on the user desktop 114 using, e.g., LINUX 116, on which a user application 117 may operate. The user desktop provides a portal view 118 through which a user may view the process and make data queries through data query service 119, either to the Cyberlock Containment Service 114 or to the enterprise data store 120.

Java client 121 may interface with individual Cyberlock node 101 through a web service call to service layer 122. Virtual Machine main node 123 interfaces with client 121 through service layer 122, and includes web service not configuration 124 and Tomcat 125. Tomcat 125 may comprise, for example, the Apache Tomcat 6.0.10 Virtual Machine appliance. Apache Tomcat is the de facto standard for open source web servers for high-traffic, high-availability environments and runs using rPath Linux. Virtual Machine server 102 may include a Tomcat or RMI thin server 126, which may operate a number of Virtual Machines 128, 129, 130, and 131 using a Perl Script 127. Note how the Cyberlock architecture isolates the Virtual Machines 128, 129, 130, and 131 from the client 121 through the Virtual Machine server 102 and service layer 122. This isolation prevents any malware operating on the Virtual Machines 128, 129, 130, and 131 from propagating through the enterprise network 113 and causing real damage.

Figure 2:
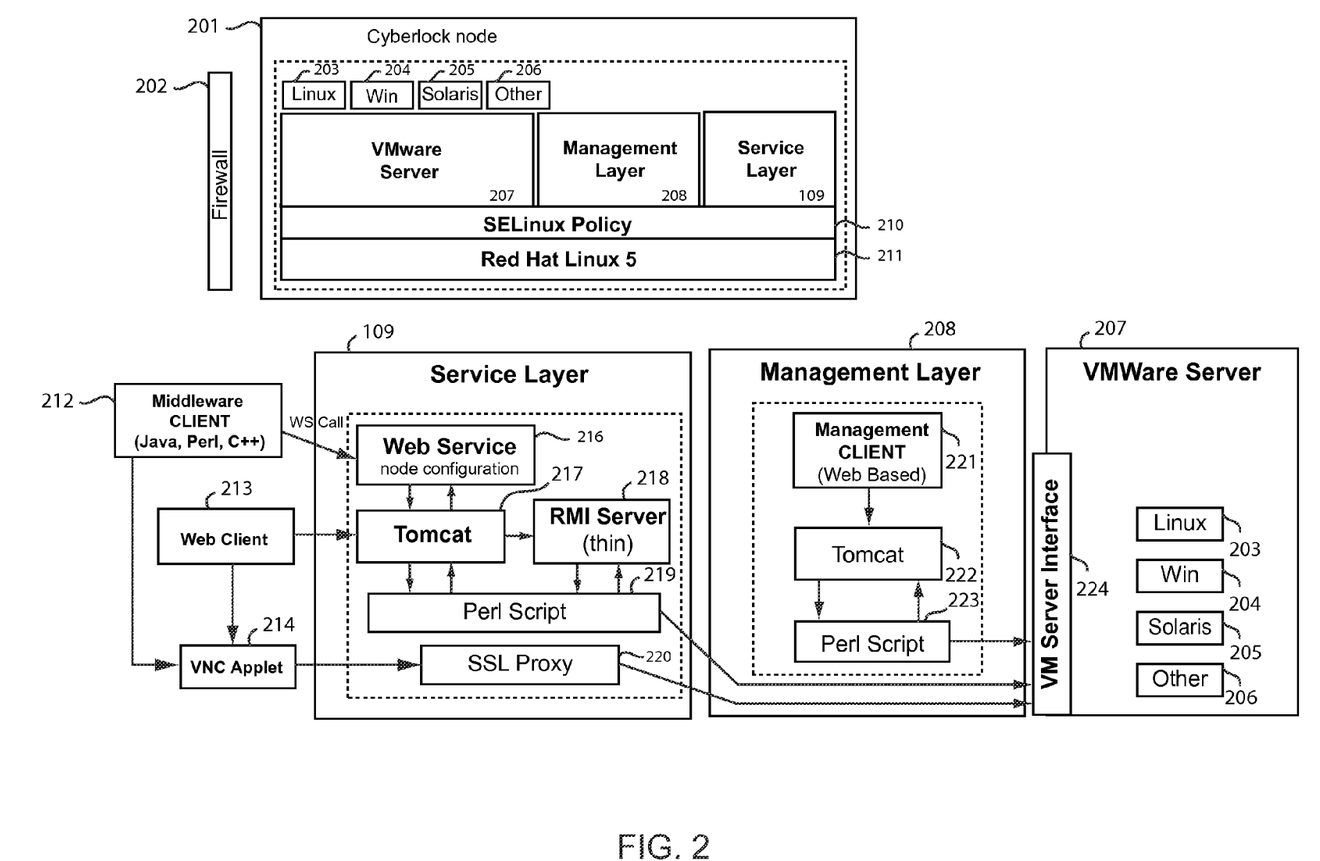
FIG. 2 is a block diagram illustrating a portion of the software architecture of the preferred embodiment of the present invention.

FIG. 2 is a block diagram illustrating the software architecture of the preferred embodiment of the present invention in an alternative embodiment. Referring to FIG. 2, Cyberlock node 201 is isolated from the enterprise network (not shown) by firewall 202. Cyberlock node 201 may include a Virtual Machine server which may run a number of different operating systems, including Linux 203, Windows 204, Solaris 205, and other operating systems 206. The Virtual Machine server may also include a VMware server 107, management layer 208, service layer 109, SELinux Policy 210 and Red Hat Linux 5 211, operating in a service layer architecture.

Middleware client 212, which may comprise a Java client, Perl script, C++ program or the like) may interface with service layer 109 through a web service call. Web client 213 may also interface with service layer 109 or both middleware client of web client may interface with service layer 109 via a VNC applet 214. Service layer 109 may include includes web service node configuration 216 and Tomcat 217. Tomcat 217 may comprise, for example, the Apache Tomcat 6.0.10 Virtual Machine appliance. Apache Tomcat is the de facto standard for open source web servers for high-traffic, high-availability environments and runs using rPath Linux. RMI thin server 218 may using a Perl Script 219 to interact with a number of Virtual Machines in VMware Server 207. Alternately, VNC Applet 214 may access VMware Server 207 via a Secure Socket Layer (SSL) proxy 220.

Management layer 208 may include a manage client 221 which may be web-based, as well as Tomcat 222 Virtual Machine appliance. Using Perl script 223, management client 221 may interact with VMware server 207 to monitor and control Virtual Machines. VMware server 207 may include a VM server interface 224 for interfacing with management layer 208 and service layer 109. VMware server 207 which may run a number of different operating systems, including Linux 203, Windows 204, Solaris 205, and other operating systems 206.

Again, note how the Cyberlock architecture isolates the Virtual Machines in VMware server 207 from middleware client 212 and web client 213 through Service layer 109 and Management layer 208. This isolation prevents any malware operating on the Virtual Machines from propagating through the enterprise network 113 and causing real damage.

Figure 3:
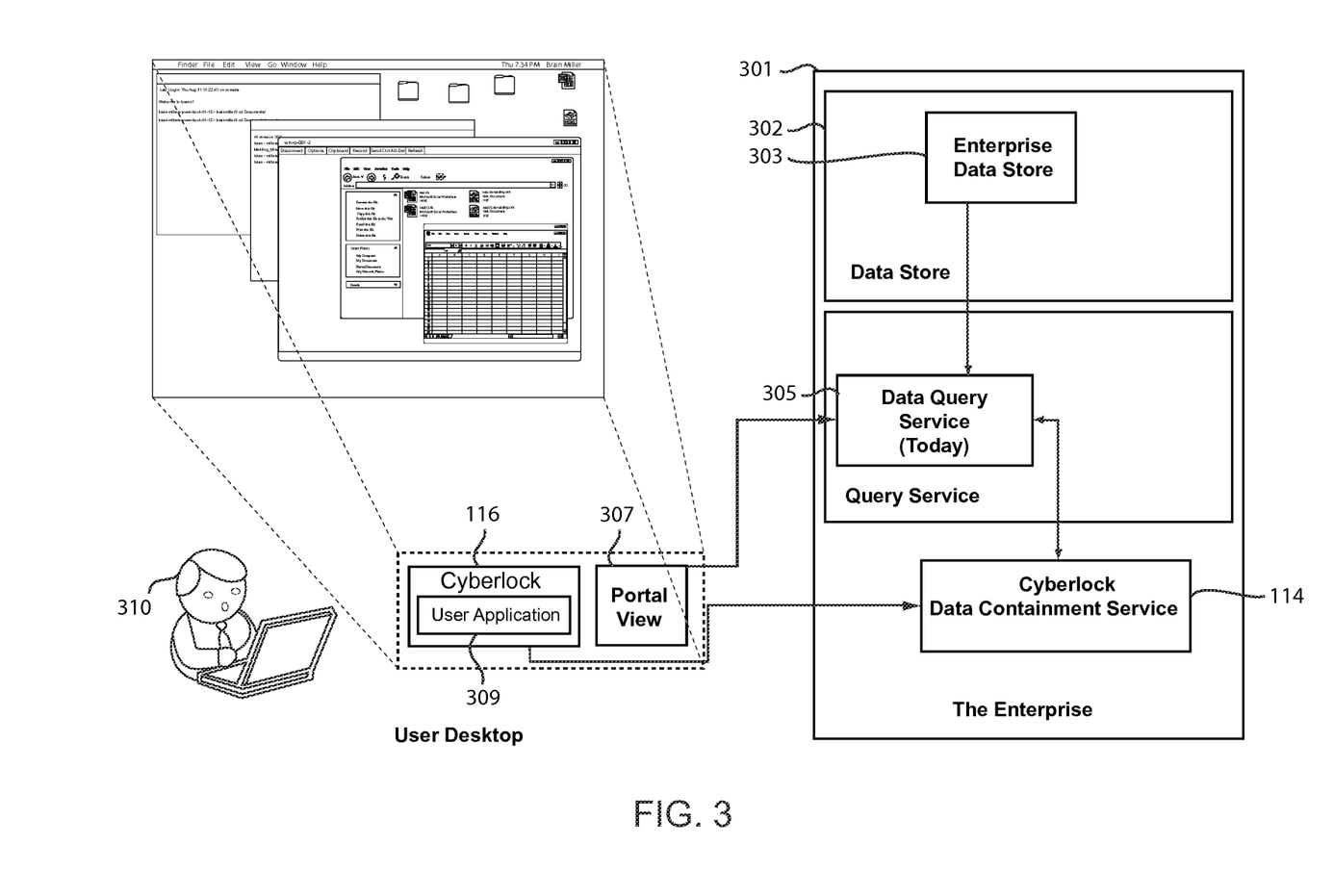
FIG. 3 is a block diagram illustrating the user flow of data in an alternative embodiment of the present invention.

FIG. 3 is a block diagram illustrating the user flow of data in the preferred embodiment of the present invention. Referring to FIG. 3, user 310 may access the stem using a desktop or other computer. A simple PC connected to a network is all that is required. A portal view 307 provides a display of the operation of the Virtual Machine running the suspected malware. Enterprise 301 represents a network or system, for example, a company computer network, and contains a data store (e.g., data server) 302 including and enterprise data store 303. Data Query service 305 received queries from portal view 307 which in turn are forwarded to Cyberlock data containment service (RAD) 114, which is described in more detail below in connection with FIGS. 4 and 5. User application 309 may also query Cyberlock Data containment service 114 as well.

Figure 4:
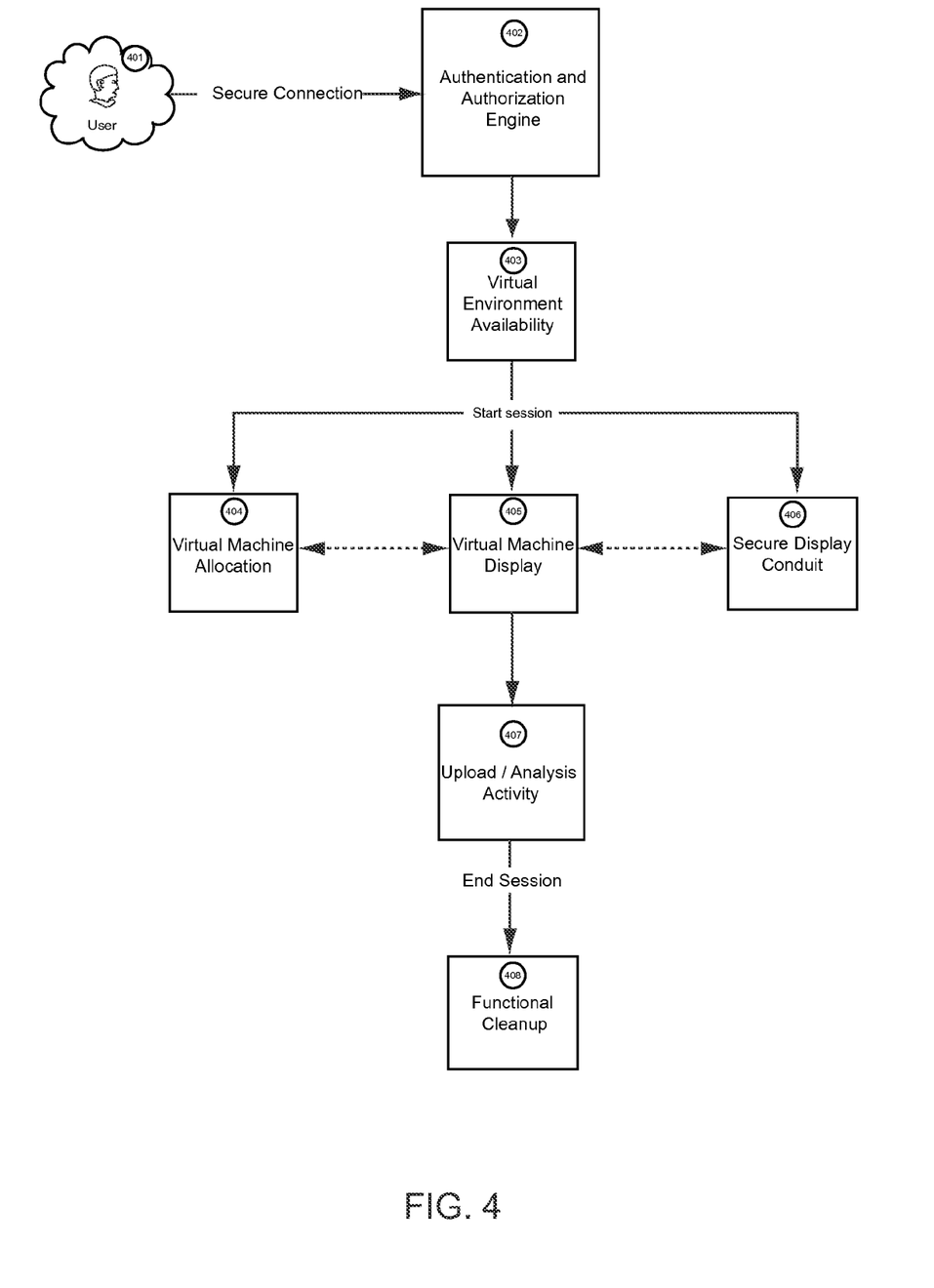
FIG. 4 illustrates the flow of operations of the appliance of the present invention.
Figure 5:
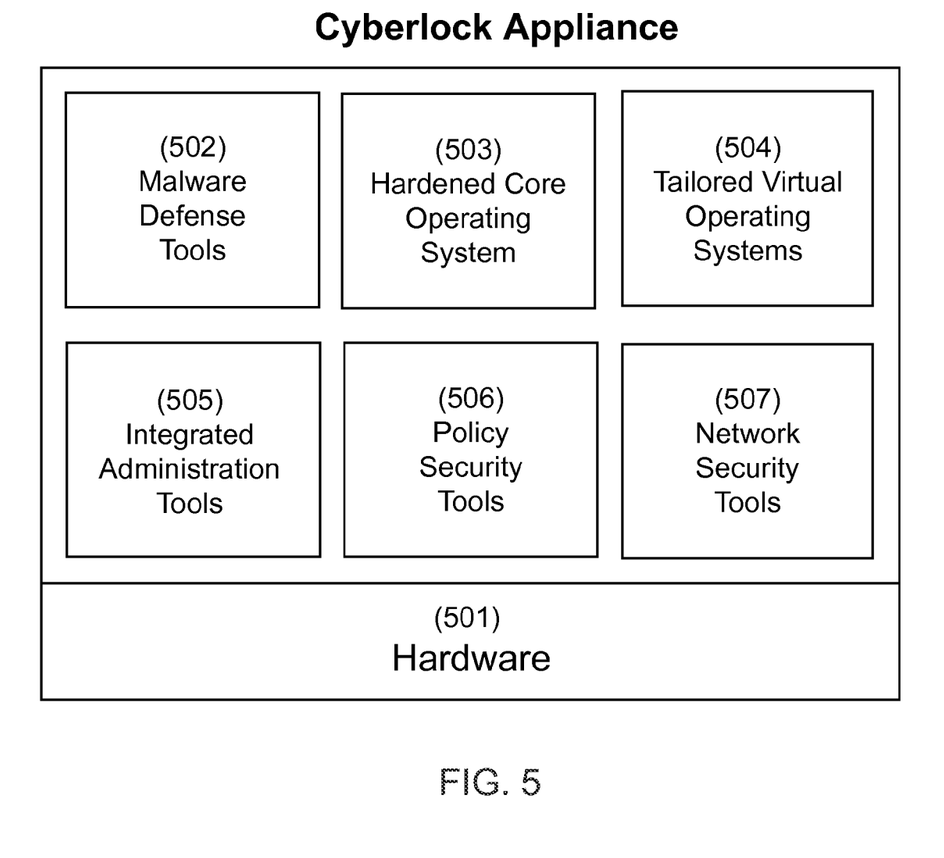
FIG. 5 illustrates the arrangement of hardware of the appliance of the present invention.

FIG. 4 illustrates the flow of operations of the appliance of the present invention. FIG. 5 illustrates the arrangement of hardware of the appliance of the present invention. Referring to FIGS. 4 and 5, The Cyberlock appliance 501 is a web-enabled platform that is capable of being deployed in both Internet and intranet environments. Consumers 401 may access the platform will use industry standard web browser and encryption tool kits. In block 402, consumers 401 of Cyberlock services utilize industry standard web browsers to access appliance-based services. This communication tunnel protection level is easily tailored by the purchaser. The system's tunnel protection mechanism can be operated in two modes. At the lowest level, it is capable of medium assurance token-based access with administrator-provided credentials. At the highest level, it can operate as a high assurance mutually authenticated Public Key Infrastructure (PKI).

In block 403, a request is made to the system for the available virtual machine types 504 of FIG. 5. A virtual machine type 504 represents a custom-assembled computer environment that is available for use. Some examples of virtual machine types 504 are: A Windows XP environment with special drug-trafficking software or Fedora Linux with a suite of malware analysis tools. The virtual machine types are presented to the user for selection.

In block 404, a request is made to the Cyberlock session service to start up an instance of the selected virtual machine type. The session service performs a number of configuration and allocation steps and then starts up a virtual machine instance matching the request parameters. In block 405, a window is opened on the user's desktop to display the virtual machine desktop and to pass back user actions (mouse and keyboard clicks).

In block 406, a secure communications tunnel is set up for protecting interaction between the virtual machine desktop display window and the Cyberlock appliance. In block 407, the user uploads data files into their allocated Cyberlock virtual machine using the secure communication tunnel. The Cyberlock session service ingests the data files and inserts them into the corresponding virtual machine. The user proceeds to perform analysis on the files and optionally save, share or print analyzed content. Printed content is sent through a special conduit and delivered back to the user via e-mail. Upon session completion, in block 408, the Cyberlock session services closes down the secure communications tunnel and directs the system to reset the virtual machine to a pristine state such that no trace of the session remains.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method of testing, in a computer network, potential malware, the method comprising the steps of:
    establishing at least one Virtual Machine on a first computer coupled to the computer network and operating suspected malware on the at least one Virtual Machine;
    coupling, at least one second computer to the computer network and the first computer such that image display data from the at least one Virtual Machine on the first computer is transmitted from the first computer to the at least one second computer for image display on the second computer;
    observing in the image display data from the at least one Virtual Machine on the first computer, from at least one second computer coupled to the computer network and the first computer, source code variables identifying attempts by the suspected malware operating on the at least one Virtual Machine to change Memory and Bridge configuration settings of the at least one Virtual Machine on the first computer to observe how the suspected malware hops memory to attempt access to a hard drive of a host operating system; and
    locking down flexible memory and partition space of RAM of the at least one Virtual Machine; to ensure that no shared memory or hard drive is accessed by the suspected malware running on the at least one Virtual Machine;
    wherein the step of locking down flexible memory and partition space of RAM of the at least one Virtual Machine comprises the steps of:
    modifying how the host operating system handles memory by lowering a sys control config file to 'zero' by setting the variable "vm.swappiness=zero" to instruct the host operating system not to swap processes out of RAM to hard disk; and
    setting a variable Vm.overcommit_memory=1 to disallow the host operating system from overcommitting memory that it currently has installed, as a backup to the process swap to keep the host operating system from swapping from RAM to disk and therefore potentially writing viruses to disk.

2. A method of testing, in a computer network, potential malware, the method comprising the steps of:
    establishing at least one Virtual Machine on a first computer coupled to the computer network and operating suspected malware on the at least one Virtual Machine;
    coupling, at least one second computer to the computer network and the first computer such that image display data from the at least one Virtual Machine on the first computer is transmitted from the first computer to the at least one second computer for image display on the second computer;
    observing in the image display data from the at least one Virtual Machine on the first computer, from at least one second computer coupled to the computer network and the first computer, source code variables identifying attempts by the suspected malware operating on the at least one Virtual Machine to change Memory and Bridge configuration settings of the at least one Virtual Machine on the first computer to observe how the suspected malware hops memory to attempt access to a hard drive of a host operating system;
    enabling an accurate aspect ratio and resolution of the image display on the at least one second computer, of the image display data from the at least one Virtual Machine using a Virtual Network Computing (VNC) protocol within the at least one Virtual Machine; and
    using a proxy to handle a secure socket layer (SSL) connection between the at least one Virtual Machine and the least one second computer to run Perl scripts that call the at least one Virtual Machine.

3. The method of claim 2, wherein the at least one Virtual Machine application programming interface (API) uses a Perl script operating between the at least one Virtual Machine and the proxy, such that if the at least one Virtual Machine displays a dialog box, the Perl Script handles communications with the at least one Virtual Machine on behalf of a user.

4. The method of claim 1, wherein transmitting image display data from the at least one Virtual Machine to the at least one second computer provides secure peering of the at least one Virtual Machine desktop back to an end user one second computer using a Virtual Network Computing (VNC) protocol within the at least one Virtual Machine.

5. The method of claim 4, further comprising the steps of:
changing a remote viewing VNC enableport password protocol in the at least one Virtual Machine to circumvent a default requirement to use a proprietary interface in the at least one Virtual Machine which requires endpoint installation, configurations of groups, usernames and passwords for all users of the system;
enabling a VNC applet SSL to communicate to a proxy server; and
creating an SSL tunnel from a user desktop on the at least one second computer to a proxy operating on the first computer with the at least one Virtual Machine.

6. The method of claim 5, wherein the SSL tunnel comprises a two-way SSL encrypted tunnel to prevent hijacking of the session and stealing passwords by the suspected malware operating on the at least one Virtual Machine, and to prevent the suspected malware operating on the at least one Virtual Machine from sitting on the server and viewing the session.

7. The method of claim 6, further comprising the step of enabling a true or false configuration within the at least one Virtual Machine to allow a VNC server to be turned on, which is set to true on a per virtual machine setting.

8. The method of claim 7, further comprising the step of:
directing data coming through a webpage to go through the proxy server, to prevent the suspected malware operating on the at least one Virtual Machine from accessing the Internet.

9. The method of claim 5, further comprising the step of:
configuring the proxy server to assign unique ports unique to each of the at least one Virtual Machines, assigned to each unique user, such that each of the at least one Virtual Machines is assigned an individual port number, allowing administrators to assign one user to one at least one of the at least one Virtual Machines.

10. The method of claim 9, further comprising the steps of:
generating a secure session authentication to ensure unique Virtual Machine sessions are assigned to a unique port for a unique user;
generating a unique password at the proxy server, to allow user access to VNC port, where each password is auto-generated to allow access, and then destroyed; and
transmitting the password via the SSL tunnel to prevent access by potential malware.

11. The method of claim 5, wherein to allow a user to observe operation of the suspected malware operating on the at least one Virtual Machine while containing the suspected malware from propagating from the at least one Virtual Machine, the method further comprises the steps of:
disabling a standard Virtual Machine display;
disabling installation of a Multilingual User Interface (MUI) file; and
turning off a console port for the Virtual Machine,
wherein the proxy server calls a specific command in the Virtual Machine to allocate a Virtual Machine session to a specific user and port.

12. The method of claim 1, further comprising the step of:
isolating a host operating system operating on the first computer, by preventing the host operating system's network interface on the first computer from being accessed by memory from the at least one Virtual Machine operating on the first computer to allow a user to observe operation of the suspected malware operating on the at least one Virtual Machine while containing the suspected malware from propagating from the at least one Virtual Machine.

13. The method of claim 12, wherein to allow a user to observe operation of the suspected malware operating on the at least one Virtual Machine while containing the suspected malware from propagating from the at least one Virtual Machine, the step of isolating the host operating system further comprises the steps of:
removing a bridge network under a Linux file system; and
instructing the at least one Virtual Machine not use the bridge using a cobbler puppet load.

14. The method of claim 1, further comprising the step of:
on the first computer, altering a default regular scheduler of the host operating system of the first computer to use the deadline regular scheduler for all requests to provide improved performance of the at least one Virtual Machine under heavy work loads.

15. The method of claim 14, further comprising the step of:
changing, in a boot menu of the host operating system on the first computer, variable 'elevator'=deadline to change the default regular scheduler of the host operating system.

16. The method of claim 1, further comprising the steps of:
creating a data bridge between the at least one Virtual Machine and one or more operating systems by generating a custom optical disc image to allow the at least one Virtual Machine to interact with one or more of Windows XP, Vista, 2000, NT, Windows 7, Linux, Solaris, Mac OS;
wherein the data bridge addresses Unicode characters coming across not normally handled by the ISO command MK ISO FS and allows any file to be converted to an optical disc image and the optical disc image transmitted across the data bridge.

17. The method of claim 2, wherein transmitting image display data from the at least one Virtual Machine to the at least one second computer provides secure peering of the at least one Virtual Machine desktop back to an end user one second computer using a Virtual Network Computing (VNC) protocol within the at least one Virtual Machine.

18. The method of claim 17, further comprising the steps of:
changing a remote viewing VNC enableport password protocol in the at least one Virtual Machine to circumvent a default requirement to use a proprietary interface in the at least one Virtual Machine which requires endpoint installation, configurations of groups, usernames and passwords for all users of the system;
enabling a VNC applet SSL to communicate to a proxy server; and
creating an SSL tunnel from a user desktop on the at least one second computer to a proxy operating on the first computer with the at least one Virtual Machine.

19. The method of claim 18, wherein the SSL tunnel comprises a two-way SSL encrypted tunnel to prevent hijacking of the session and stealing passwords by the suspected malware operating on the at least one Virtual Machine, and to prevent the suspected malware operating on the at least one Virtual Machine from sitting on the server and viewing the session.

20. The method of claim 19, further comprising the step of enabling a true or false configuration within the at least one Virtual Machine to allow a VNC server to be turned on, which is set to true on a per virtual machine setting.

21. The method of claim 20, further comprising the step of:
directing data coming through a webpage to go through the proxy server, to prevent the suspected malware operating on the at least one Virtual Machine from accessing the Internet.

22. The method of claim 18, further comprising the step of:
configuring the proxy server to assign unique ports unique to each of the at least one Virtual Machines, assigned to each unique user, such that each of the at least one Virtual Machines is assigned an individual port number, allowing administrators to assign one user to one at least one of the at least one Virtual Machines.

23. The method of claim 22, further comprising the steps of:
generating a secure session authentication to ensure unique Virtual Machine sessions are assigned to a unique port for a unique user;
generating a unique password at the proxy server, to allow user access to VNC port, where each password is auto-generated to allow access, and then destroyed; and
transmitting the password via the SSL tunnel to prevent access by potential malware.

24. The method of claim 18, wherein to allow a user to observe operation of the suspected malware operating on the at least one Virtual Machine while containing the suspected malware from propagating from the at least one Virtual Machine, the method further comprises the steps of:
disabling a standard Virtual Machine display;
disabling installation of a Multilingual User Interface (MUI) file; and
turning off a console port for the Virtual Machine,
wherein the proxy server calls a specific command in the Virtual Machine to allocate a Virtual Machine session to a specific user and port.

25. The method of claim 2, further comprising the step of:
isolating a host operating system operating on the first computer, by preventing the host operating system's network interface on the first computer from being accessed by memory from the at least one Virtual Machine operating on the first computer to allow a user to observe operation of the suspected malware operating on the at least one Virtual Machine while containing the suspected malware from propagating from the at least one Virtual Machine.

26. The method of claim 25, wherein to allow a user to observe operation of the suspected malware operating on the at least one Virtual Machine while containing the suspected malware from propagating from the at least one Virtual Machine, the step of isolating the host operating system further comprises the steps of:
removing a bridge network under a Linux file system; and
instructing the at least one Virtual Machine not use the bridge using a cobbler puppet load.

27. The method of claim 2, further comprising the step of:
on the first computer, altering a default regular scheduler of the host operating system of the first computer to use the deadline regular scheduler for all requests to provide improved performance of the at least one Virtual Machine under heavy work loads.

28. The method of claim 27, further comprising the step of:
changing, in a boot menu of the host operating system on the first computer, variable 'elevator'=deadline to change the default regular scheduler of the host operating system.

29. The method of claim 2, further comprising the steps of:
creating a data bridge between the at least one Virtual Machine and one or more operating systems by generating a custom optical disc image to allow the at least one Virtual Machine to interact with one or more of Windows XP, Vista, 2000, NT, Windows 7, Linux, Solaris, Mac OS;
wherein the data bridge addresses Unicode characters coming across not normally handled by the ISO command MK ISO FS and allows any file to be converted to an optical disc image and the optical disc image transmitted across the data bridge.

30. The method of claim 1, wherein the at least one Virtual Machine application programming interface (API) uses a Perl script operating between the at least one Virtual Machine and the proxy, such that if the at least one Virtual Machine displays a dialog box, the Perl Script handles communications with the at least one Virtual Machine on behalf of a user.

* * * * *